United States Patent
Riedl et al.

(10) Patent No.: US 11,680,498 B2
(45) Date of Patent: Jun. 20, 2023

(54) METHOD FOR OPERATING AN ELECTROMECHANICAL CAMSHAFT PHASER

(71) Applicant: Schaeffler Technologies AG & Co. KG, Herzogenaurach (DE)

(72) Inventors: Tobias Riedl, Aurachtal (DE); Christian Karbacher, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/612,655

(22) PCT Filed: May 20, 2020

(86) PCT No.: PCT/DE2020/100440
§ 371 (c)(1),
(2) Date: Nov. 19, 2021

(87) PCT Pub. No.: WO2020/233754
PCT Pub. Date: Nov. 26, 2020

(65) Prior Publication Data
US 2022/0220870 A1    Jul. 14, 2022

(30) Foreign Application Priority Data
May 20, 2019   (DE) ............ 10 2019 113 300.9

(51) Int. Cl.
*F01L 1/352*      (2006.01)
*F01L 13/00*      (2006.01)

(52) U.S. Cl.
CPC ....... *F01L 1/352* (2013.01); *F01L 2001/3521* (2013.01); *F01L 2013/103* (2013.01);
(Continued)

(58) Field of Classification Search
CPC .............. F01L 1/352; F01L 2001/3521; F01L 2013/103; F01L 2013/111; F01L 2201/00;
(Continued)

(56) References Cited

U.S. PATENT DOCUMENTS

| 4,090,194 A | 5/1978 | Kosuge |
| 7,146,947 B2 | 12/2006 | Neubauer et al. |

(Continued)

FOREIGN PATENT DOCUMENTS

| CN | 101821484 A | 9/2010 |
| CN | 103362657 A | 10/2013 |

(Continued)

OTHER PUBLICATIONS

See Corresponding Search Report for International Application PCT/DE2020/100440.

*Primary Examiner* — Jorge L Leon, Jr.
(74) *Attorney, Agent, or Firm* — Davidson, Davidson & Kappel, LLC

(57) ABSTRACT

An electromechanical camshaft phaser (3) comprises a setting gear (4) and an electric motor (5), which is controlled by means of an electric-motor control unit (6). Data concerning the operation of the electric motor (5) including position changes of its motor shaft are transferred via a data bus (8) from the electric-motor control unit (6) to an engine control unit (7) of the internal combustion engine (1) comprising the camshaft phaser (3). In addition, recurring time signals are transferred from the electric-motor control unit (6) to the engine control unit (7) via a separate line (9), by which harder real-time requirements are met than by the data bus (8). The time signals are used to generate a time difference signal in the engine control unit (7) by comparison with the data received by the engine control unit (7), which time difference signal is fed back to the electric-motor control unit (6) via the data bus (8) and is used there to (Continued)

synchronize the electric-motor control unit (6) with the engine control unit (7).

15 Claims, 1 Drawing Sheet

(52) U.S. Cl.
CPC ...... *F01L 2013/111* (2013.01); *F01L 2201/00* (2013.01); *F01L 2800/09* (2013.01); *F01L 2800/14* (2013.01); *F01L 2820/032* (2013.01); *F01L 2820/041* (2013.01)

(58) Field of Classification Search
CPC ............... F01L 2800/09; F01L 2800/14; F01L 2820/032; F01L 2820/041
USPC ........................................................ 123/90.15
See application file for complete search history.

(56) References Cited

U.S. PATENT DOCUMENTS

| | | | |
|---|---|---|---|
| 8,726,880 B2* | 5/2014 | Stewart | .................... F02D 13/00 |
| | | | 123/480 |
| 9,347,341 B2* | 5/2016 | Matsuo | ................. F02D 41/062 |
| 2003/0014680 A1 | 1/2003 | Zielbauer | |
| 2005/0183681 A1 | 8/2005 | Axmacher et al. | |
| 2005/0211208 A1 | 9/2005 | Axmacher et al. | |
| 2009/0222630 A1 | 9/2009 | Kang | |
| 2010/0218738 A1 | 9/2010 | Ai et al. | |
| 2012/0140861 A1 | 6/2012 | Menon et al. | |
| 2013/0261929 A1 | 10/2013 | Stewart et al. | |
| 2015/0345345 A1 | 12/2015 | Showalter | |
| 2016/0186618 A1 | 6/2016 | Simpson | |
| 2017/0037745 A1 | 2/2017 | Baek et al. | |
| 2017/0292898 A1 | 10/2017 | Schweikert et al. | |
| 2018/0230865 A1 | 8/2018 | Brown | |

FOREIGN PATENT DOCUMENTS

| | | |
|---|---|---|
| DE | 10236507 A1 | 2/2004 |
| DE | 10242659 A1 | 3/2004 |
| DE | 10259133 A1 | 7/2004 |
| DE | 102005022714 A1 | 11/2006 |
| DE | 102012219297 A1 | 5/2013 |
| DE | 112015002291 T5 | 2/2017 |
| DE | 102017104015 A1 | 10/2017 |
| DE | 102017119860 A1 | 4/2018 |
| DE | 102017126527 A1 | 5/2018 |
| JP | 2011140890 A | 7/2011 |
| JP | 2015537159 A | 12/2015 |
| JP | 2016526642 A | 9/2016 |
| JP | 2018132060 A | 8/2018 |
| WO | WO0201363 A1 | 1/2002 |

* cited by examiner

METHOD FOR OPERATING AN ELECTROMECHANICAL CAMSHAFT PHASER

CROSS-REFERENCE TO RELATED APPLICATIONS

This application is the U.S. National Phase of PCT Appln. No. PCT/DE2020/100440 filed May 20, 2020, which claims priority to DE 10 2019 113 300.9 filed May 20, 2019, the entire disclosures of which are incorporated by reference herein.

The present disclosure relates to a method for operating an electromechanical camshaft phaser. The present disclosure also relates to a device for controlling an internal combustion engine comprising at least one electromechanical camshaft phaser.

BACKGROUND

Methods for operating an internal combustion engine with electromechanical camshaft phasing are described, for example, in DE 102 59 133 A1. In this case, the camshaft phaser, that is, the arrangement for adjusting the relative angle of rotation between the camshaft and the crankshaft of the internal combustion engine, has a modular structure, wherein components of the arrangement are partly used by other control and regulating devices of the internal combustion engine. A control unit of the electric motor of the camshaft phaser is connected to a second control unit, which is the engine control unit of the internal combustion engine.

Electromechanical camshaft phasers generally have the advantage over hydraulic camshaft phasers that adjustment of the camshaft is possible even when the internal combustion engine is stationary. In this context, reference is made to DE 10 2012 219 297 A1 as an example.

Further methods for operating camshaft phasers are disclosed, for example, in the documents DE 102 36 507 A1, DE 10 2005 022 714 A1, DE 10 2017 104 015 A1 and DE 102 42 659 A1.

SUMMARY

An object of the present disclosure is to further develop an electromechanical camshaft phaser with regard to the most efficient possible use of resources, in particular with regard to data processing processes, compared to the cited prior art.

This object is achieved according to the present disclosure by a method for operating an electromechanical camshaft phaser with the features of claim 1. The method can be carried out with the aid of a device for controlling an internal combustion engine according to claim 7. The configurations and advantages of the present disclosure explained below in connection with the control device also apply analogously to the operating method, and vice versa. Advantageous further developments of the present disclosure are described in the dependent claims.

The camshaft phaser, which is operated according to the method according to the present disclosure, comprises a setting gear, in particular in the form of a triple-shaft gear mechanism, and an electric motor provided for actuating the setting gear, which is controlled by means of an electric-motor control unit. Data relating to the operation of the electric motor, including position changes of its motor shaft, are transmitted via a data bus from the electric-motor control unit to an engine control unit of the internal combustion engine comprising the camshaft phaser. In addition, recurring time signals are transmitted from the electric-motor control unit to the engine control unit of the internal combustion engine via a separate line, by means of which harder real-time requirements are met than by means of the data bus. Said time signals are used to generate a time difference signal in the engine control unit by comparing it with the data received by the engine control unit from the electric-motor control unit, which is fed back to the electric-motor control unit via the data bus and is used there to synchronize the electric-motor control unit with the engine control unit.

The data bus, which connects the electric-motor control unit with the engine control unit of the internal combustion engine and both control units with further components of the internal combustion engine, is in particular a CAN bus. Although it does not meet any hard real-time requirements, this data bus is used to transmit the time difference signal required for synchronization from the electric-motor control unit to the engine control unit of the internal combustion engine. In the opposite direction, that is from the electric-motor control unit to the engine control unit, the data bus is bypassed, in that time signals are transmitted over the separate line. Overall, a high-precision synchronization is possible with the best possible utilization of the hardware resources.

Various configurations are possible with regard to the distribution of data processing processes to the two control units, that is to say on the one hand, the engine control unit of the internal combustion engine, and on the other hand, the electric-motor control unit controlling the camshaft phaser. For example, successive processes which relate to the camshaft phaser are processed both in the electric-motor control unit and in the engine control unit, wherein the respective data on the processes are recorded in a ring memory integrated in the electric-motor control unit, or in the engine control unit. In a preferred embodiment of the method, the evaluation of the data stored in the ring memories takes place, for the most part, within the electric-motor control unit.

The duration of each process, which is also generally referred to as a task, is typically at least twice, in particular at least three times, the time difference used for synchronization between the various control units.

The data recorded and transmitted by the electric-motor control unit can include trigger signals which relate to a specific camshaft position and are provided with a time stamp.

Hall sensors, for example, can be used in a known manner known to detect the angular position and/or direction of rotation of the rotor of the electric motor. The electric motor is preferably a brushless direct current motor. The setting gear, which is actuated by means of the electric motor, is designed, for example, as a harmonic drive. With regard to the design features, reference is made, for example, to the documents DE 10 2017 119 860 A1 and DE 10 2017 126 527 A1.

BRIEF SUMMARY OF THE DRAWINGS

In the following, an exemplary embodiment of the present disclosure is explained in more detail by means of a drawing. In the figures.

DETAILED DESCRIPTION

Figure 1:
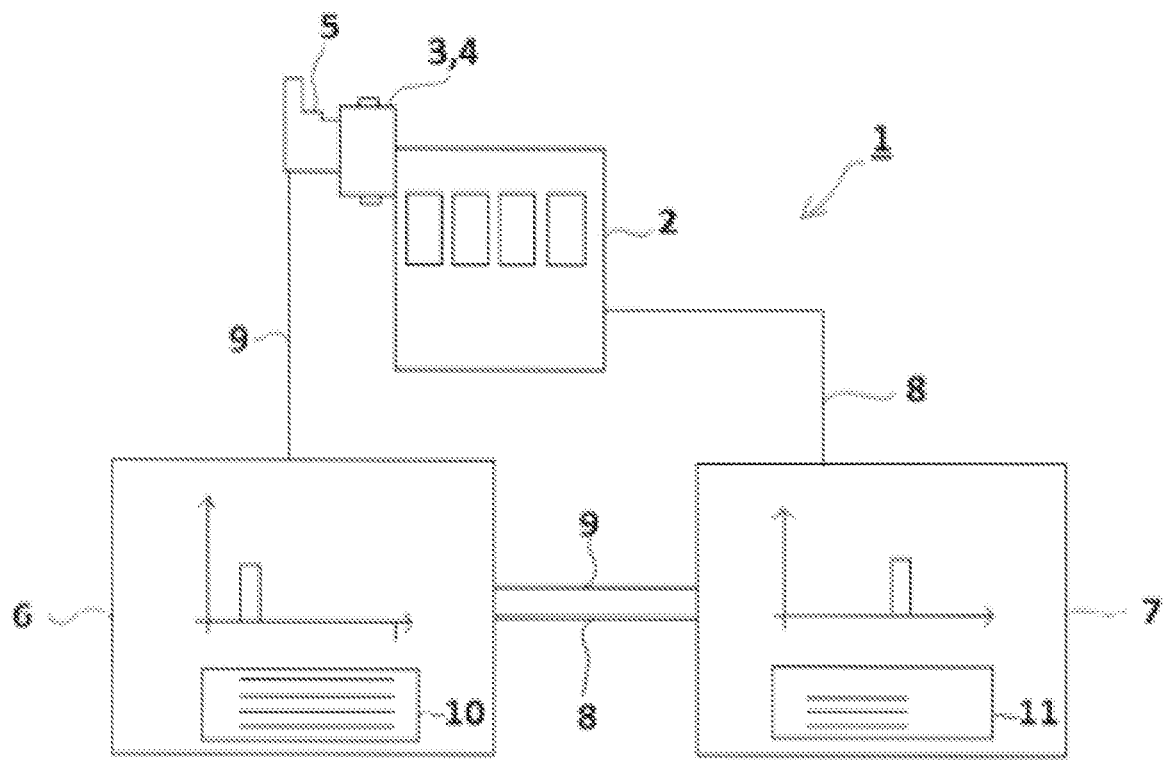
FIG. 1 shows a symbolized representation of an internal combustion engine with a camshaft phaser and control units.

An internal combustion engine 1, shown merely symbolically in FIG. 1, the engine block of which is denoted by 2, has an electromechanical camshaft phaser 3. A setting gear 4 of the camshaft phaser 3 is designed as a triple-shaft gear mechanism, for example a harmonic drive. In this case, a first shaft of the setting gear 4 is identically or permanently connected to a belt or chain wheel and rotates in a known manner at half the crankshaft speed of the internal combustion engine 1. A second, output-side shaft of the setting gear 4 is connected in a rotationally-fixed manner to the camshaft which is to be phased. To adjust the angle between the input-side shaft connected to the chain or belt wheel and the output-side shaft of the setting gear 4, the setting gear 4 has a third shaft in the form of a setting shaft which is connected in a rotationally-fixed manner to the motor shaft of an electric motor 5, which is assigned to the camshaft phaser 3. The electric motor 5 is controlled by means of an electric-motor control unit 6, which is also referred to as a driver box, via a line 9.

The electric-motor control unit 6 is linked, to the engine control unit, labeled 7, of the internal combustion engine 1, via a data bus 8, namely a CAN bus. The control units 6, 7 are designed to process processes, which are generally referred to as tasks and are illustrated in FIG. 1 using diagrams. Each control unit 6, 7 comprises a data memory designed as a ring memory 10, 11. Individual data packets, which are kept ready for evaluations in the ring memory 10, 11 of the respective control unit 6, 7 are illustrated in FIG. 1 by parallel lines. The processing of this data is to be understood as batch processing of data. As illustrated in FIG. 1, the number of data processing tasks to be processed by the electric-motor control unit 6 exceeds the number of data processing tasks to be carried out by the engine control unit 7. In the exemplary embodiment illustrated, the ratio between the number of data packets to be processed stored in the ring memory 10 of the electric-motor control unit 6 to the number of data packets to be processed in an analog manner by the engine control unit 7 is 4:3. In modified variants, not shown, other ratios, for example the ratio 4:1, are also possible. In all cases, the evaluation of the data stored in the various ring memories 10, 11, insofar as they relate to the camshaft phaser 3, takes place, for the most part, within the electric-motor control unit 6. This means that the engine control unit 7 is only burdened to a minor extent with the processing of data relating to the operation of the camshaft phaser 3.

In addition to the CAN bus 8, there is a line 9, with which a data connection is established between electric-motor control unit 6 and the engine control unit 7. The line 9 is used to send time signals from the electric-motor control unit 6 to the engine control unit 7. The data volume of the transmitted time signals is only a small fraction of the data transmitted between the electric-motor control unit 6 and the engine control unit 7 via the CAN bus 8. However, in contrast to the CAN bus 8, hard real-time requirements can be met with the aid of the line 9.

Figure 2:
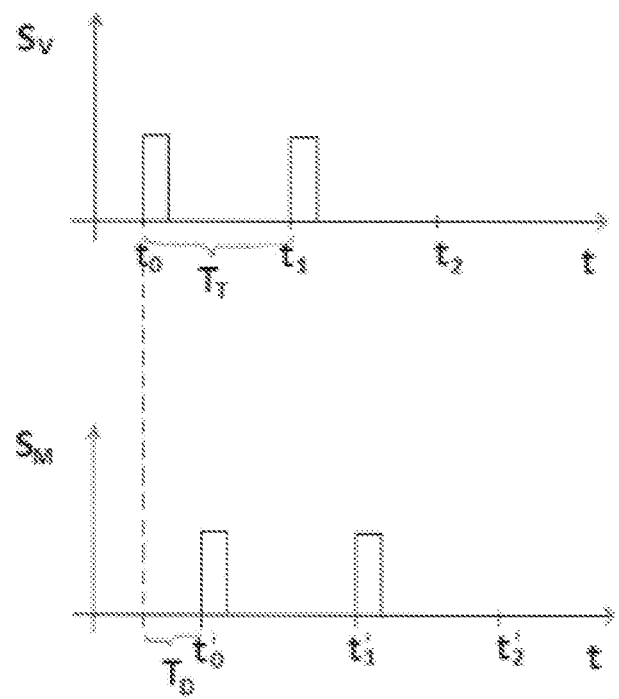
FIG. 2 shows a diagram explaining the operation of the internal combustion engine according to FIG. 1.

Data processing processes which relate to specific, similar signal patterns and which are to be carried out in the electric-motor control unit 6 and in the engine control unit 7 are illustrated in FIG. 2. Here, the upper diagram in FIG. 2 relates to the electric-motor control unit 6. Signals to be processed by the electric-motor control unit 6 are denoted by $S_V$. The lower diagram in FIG. 2 relates to the data processing carried out by the engine control unit 7. In this case, signals to be processed are denoted by $S_M$. A process to be processed by the electric-motor control unit 6 is expected, which begins at time $t_0$ and lasts until time $t_1$. The duration of this process, that is to say task, is denoted by $T_T$. Data that is to be assigned to the task of duration $T_T$ includes information relating to the electric motor 5 and the camshaft to be phased. This includes, for example, the detection of reference marks on the camshaft or a part that has a fixed angular relationship to the camshaft. The direction of rotation of the setting shaft, which is identically or permanently connected to the motor shaft of the electric motor 5, is also recorded and evaluated within the context of the task. The same applies to any changes in the state or the duration of individual states of components of the electric motor 5. A component of the electric motor 5 that should be mentioned in particular is its rotor, wherein its angular position and change in angle, if stored in the ring memory 10, is included in the data processing within the electric-motor control unit 6.

Insofar as data of the task with which the electric-motor control unit 6 is concerned are transmitted to the engine control unit 7, the corresponding signal patterns also appear in the engine control unit 7, as can be seen from FIG. 2. Timings in the engine control unit 7 that can be assigned to the timings $t_0$, $t_1$ and $t_2$ are denoted by $t_0'$, $t_1'$ and $t_2'$. Due to the given properties of the CAN bus 8, a time difference occurs between the data received in the engine control unit 7 and the data sent by the electric-motor control unit 6, which is denoted by $T_D$ in FIG. 2. The time difference $T_D$ is less than half the task duration $T_T$. The value of the time difference $T_D$ is used to set the clock of the electric-motor control unit 6 according to the engine control unit 7 and thus to synchronize the data processing processes in the control units 6, 7.

LIST OF REFERENCE SYMBOLS

1 Internal combustion engine
2 Engine block
3 Camshaft phaser
4 Setting gear
5 Electric motor
6 Electric-motor control unit
7 Engine control unit of the internal combustion engine
8 CAN data bus
9 Line
10 Ring memory in the electric-motor control unit
11 Ring memory in the engine control unit
$S_M$ signal, processed by engine control
$S_V$ signal processed by electric-motor control
t Time
$t_0$, $t_1$, $t_2$ timings relating to the data processing in the electric-motor control unit
$t_0'$, $t_1'$, $t_2'$ timings relating to the data processing in the engine control unit
$T_D$ time difference
$T_T$ Duration of a task

What is claimed is:
1. A method for operating an electromechanical camshaft phaser including a setting gear and an electric motor provided for actuating the setting gear, the electric motor controlled via an electric-motor control unit, the method comprising:
recording data relating to operation of the electric motor in the electric-motor control unit, the data including position changes of a motor shaft of the electric motor;
transmitting the data via a data bus from the electric-motor control unit to an engine control unit of an internal combustion engine which comprises the camshaft phaser;

transmitting recurring time signals from the electric-motor control unit to the engine control unit via a separate line;
generating a time difference signal in the engine control unit based on a comparison of the data to the recurring time signals transmitted to the engine control unit;
transmitting the time difference signal from the engine control unit to the electric-motor control unit via the data bus;
synchronizing the electric-motor control unit with the engine control unit based on the time difference signal transmitted to the electric-motor control unit; and
controlling the internal combustion engine via the synchronized electric-motor control unit and engine control unit.

2. The method according to claim 1, further comprising:
processing successive processes relating to the camshaft phaser in the electric-motor control unit and in the engine control unit; and
recording data relating to the successive processes in a ring memory integrated in each of the electric-motor control unit and the engine control unit.

3. The method according to claim 2, further comprising evaluating the data recorded in the ring memories, wherein a majority of the evaluating takes place within the electric-motor control unit.

4. The method according to claim 1, wherein the data recorded and transmitted from the electric-motor control unit to the engine control unit further includes trigger signals relating to a-specific camshaft positions each provided with a time stamp.

5. The method according to claim 4, further comprising detecting position changes of a rotor of the electric motor via Hall sensors.

6. A device for controlling an internal combustion engine including at least one electromechanical camshaft phaser comprising a setting gear and an electric motor provided for actuating the setting gear, the device comprising:
an engine control unit configured to control the internal combustion engine; and
an electric-motor control unit configured to control the electric motor, the engine control unit and the electric-motor control unit being programmed to:
record data relating to operation of the electric motor in the electric-motor control unit, the data including position changes of a motor shaft of the electric motor;
transmit the data via a data bus from the electric-motor control unit to the engine control unit;
transmit recurring time signals from the electric-motor control unit to the engine control unit via a separate line;
generate a time difference signal in the engine control unit based on a comparison of the data to the recurring time signals transmitted to the engine control unit;
transmit the time difference signal from the engine control unit to the electric-motor control unit via the data bus;
synchronize the electric-motor control unit with the engine control unit based on the time difference signal transmitted to the electric-motor control unit; and
control the internal combustion engine via the synchronized electric-motor control unit and engine control unit.

7. The device according to claim 6, wherein a volume of data transmitted via the separate line is less than a volume of data transmitted via the data bus.

8. An internal combustion engine comprising:
an engine block; and
the device according to claim 6.

9. The internal combustion engine according to claim 8, wherein the data bus is configured to transmit the data between the electric-motor control unit and the engine control unit and between the engine control unit and the engine block, and the separate line is configured to transmit data between the electric-motor control unit and the engine control unit and between the electric-motor control unit and the electric motor.

10. A method for operating an electromechanical camshaft phaser including a setting gear and an electric motor provided for actuating the setting gear, the electric motor being controlled by via an electric-motor control unit, the method comprising:
recording data relating to operation of the electric motor in the electric-motor control unit, the data including position changes of a motor shaft of the electric motor;
transmitting the data via a data bus from the electric-motor control unit to an engine control unit of an internal combustion engine which comprises the camshaft phaser;
transmitting recurring time signals from the electric-motor control unit to the engine control unit via a separate line;
generating a time difference signal in the engine control unit based on a comparison of the data to the recurring time signals transmitted to the engine control unit;
transmitting the time difference signal from the engine control unit to the electric-motor control unit via the data bus;
synchronizing the electric-motor control unit with the engine control unit based on the time difference signal transmitted to the electric-motor control unit; and
controlling the internal combustion engine via the synchronized electric-motor control unit and engine control unit,
wherein a volume of data transmitted via the separate line is less than a volume of data transmitted via the data bus.

11. The method according to claim 10, wherein the recurring time signals are stored in a memory of the electric-motor control unit and a memory of the engine control unit, and
wherein the time difference signal represents an offset in a timing of the recurring time signals stored in the memory of the electric-motor control unit from a timing of the recurring time signals stored in the memory of the engine control unit.

12. The method according to claim 11, wherein the recurring time signals represent tasks to be processed by via the electric-motor control unit, at least one of the tasks having a task duration, and
wherein the offset is less than half of the task duration.

13. The method according to claim 10, wherein the data further includes detection of reference marks on a camshaft or a part that has a fixed angular relationship to the camshaft.

14. The method according to claim 10, wherein the data further includes a direction of rotation of a setting shaft connected to the motor shaft.

15. The method according to claim 10, wherein each of the recurring time signals represents a task to be processed via the electric-motor control unit, the method further comprising controlling the electric motor via the electric-motor control unit so as to perform each task.

* * * * *